United States Patent
Kim

(10) Patent No.: US 8,292,042 B2
(45) Date of Patent: Oct. 23, 2012

(54) ELECTRIC DISK BRAKE

(75) Inventor: Joo Gon Kim, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 356 days.

(21) Appl. No.: 12/625,434

(22) Filed: Nov. 24, 2009

(65) Prior Publication Data

US 2010/0126811 A1 May 27, 2010

(30) Foreign Application Priority Data

Nov. 26, 2008 (KR) .......................... 10-2008-117809

(51) Int. Cl.
*F16D 55/08* (2006.01)
*B60L 7/00* (2006.01)

(52) U.S. Cl. ...................................... 188/72.8; 188/162

(58) Field of Classification Search .................. 188/72.6, 188/72.7, 72.8, 156, 157, 158, 161, 162
See application file for complete search history.

(56) References Cited

U.S. PATENT DOCUMENTS

| | | | | |
|---|---|---|---|---|
| 3,809,191 | A * | 5/1974 | Woodward ..................... | 188/162 |
| 5,107,967 | A | 4/1992 | Fujita et al. | |
| 6,189,661 | B1 * | 2/2001 | Schaffer ......................... | 188/157 |
| 6,279,692 | B1 * | 8/2001 | Siepker et al. ................. | 188/162 |
| 6,830,141 | B1 * | 12/2004 | Neelakantan et al. ........ | 188/158 |
| 7,455,152 | B2 * | 11/2008 | Wang ............................ | 188/156 |
| 2004/0124042 | A1 * | 7/2004 | Kriz, II .......................... | 188/162 |

FOREIGN PATENT DOCUMENTS

| | | |
|---|---|---|
| DE | 40 21 572 A1 | 1/1991 |
| DE | 196 11 910 A1 | 10/1997 |
| DE | 196 11 911 A1 | 10/1997 |
| DE | 196 17 796 A1 | 11/1997 |
| DE | 196 31 592 A1 | 2/1998 |
| DE | 197 41 869 A1 | 1/1999 |
| DE | 10 2006 040 129 A1 | 1/2008 |
| JP | 2007-120728 A | 5/2007 |
| KR | 10-1998-0064778 | 10/1998 |
| KR | 10-2000-0048650 | 7/2000 |
| KR | 10-2003-093691 A | 12/2003 |
| KR | 2003-0093691 | 12/2003 |
| WO | WO 97/36116 A1 | 10/1997 |

OTHER PUBLICATIONS

German Office Action, with English translation, issued in German Patent Application No. 10 2009 054 294.9-12, mailed Oct. 6, 2010.
Chinese Office Action, w/ English translation thereof, issued in Chinese Patent Application No. 200910246840.5, dated Mar. 31, 2012.

* cited by examiner

*Primary Examiner* — Thomas J Williams

(74) *Attorney, Agent, or Firm* — McDermott Will & Emery LLP

(57) ABSTRACT

Disclosed is an electric disc brake. The electric disc brake includes friction pads for pressing a disc, a carrier for supporting the friction pads, a caliper housing supported by the carrier such that the caliper housing moves back and forth to press the friction pads, and a pressing device for pressing the friction pads. The pressing device includes a pressing member moving back and forth in the caliper housing to press one of the friction pads, a screw shaft coupled to the pressing member, a worm wheel coupled to the screw shaft, a driving shaft crossing the screw shaft and having a worm gear engaged with the worm wheel, a motor for rotating the driving shaft in a forward direction or a reverse direction, and an auxiliary pressing device.

1 Claim, 4 Drawing Sheets

ELECTRIC DISK BRAKE

This application claims the benefit of Korean Patent Application No. 10-2008-0117809 filed on Nov. 26, 2008, in the Korean Intellectual Property Office, the disclosure of which is incorporated herein by reference.

BACKGROUND OF THE INVENTION

1. Field of the Invention

The present invention relates to an electric disc brake.

2. Description of the Related Art

Different from a typical hydraulic disc brake, an electric disc brake employs an electric motor as a power source for a driving device that presses a friction pad.

Korean unexamined patent publication No. 2003-0093691 discloses such an electric disc brake. The electric disc brake includes a motor rotating in the forward or reverse direction for the purpose of braking and releasing operations, a screw gear part coupled to a rotating shaft of the motor, and a piston that presses a friction pad while moving back and forth according to rotation of the screw gear part.

Meanwhile, an electric parking brake is a device for performing the parking assist braking function by using a motor. The electric parking brake is installed in a vehicle separately from the electric disc brake.

However, there is no back-up function when the electric disc brake or the electric parking brake malfunctions.

SUMMARY OF THE INVENTION

Accordingly, it is an aspect of the present invention to provide an electric disc brake capable of performing the electric braking function as well as the parking assist braking function without an additional electric parking brake.

Additional aspects and/or advantages of the invention will be set forth in part in the description which follows and, in part, will be apparent from the description, or may be learned by practice of the invention.

The foregoing and/or other aspects of the present invention are achieved by providing an electric disc brake including friction pads for pressing a disc, a carrier for supporting the friction pads, a caliper housing supported by the carrier such that the caliper housing moves back and forth to press the friction pads, and a pressing device for pressing the friction pads. The pressing device includes a pressing member moving back and forth in the caliper housing to press one of the friction pads, a screw shaft coupled to the pressing member, a worm wheel coupled to the screw shaft, a driving shaft crossing the screw shaft and having a worm gear engaged with the worm wheel, a is motor for rotating the driving shaft in a forward direction or a reverse direction, and an auxiliary pressing device.

The auxiliary pressing device may include an auxiliary motor, a first gear fitted around the auxiliary motor, a first gear shaft coupled to the first gear, and a second gear fitted around the first gear shaft and connected to the driving shaft.

The auxiliary pressing device may include a first gear fitted around the driving shaft, a second gear engaged with the first gear, an auxiliary motor, a third gear fitted around a shaft of the auxiliary motor, and a third gear shaft coupled to the third gear, wherein the second gear is coupled to the third gear shaft.

The auxiliary pressing device may include an auxiliary motor, a first gear fitted around a shaft of the auxiliary motor, and a second gear engaged with the first gear and connected to the driving shaft.

According to the electric disc brake of the present invention, the rotational speed of the motor is reduced by the worm gear and the worm wheel, so the pressing member can press the first friction pad with greater force, thereby generating greater braking force.

In addition, according to the present invention, since speed reduction may occur while rotational force of the motor is being transferred to the screw shaft, sufficient braking force can be achieved even if the motor has a small size and a low output, so that a volume of a device can be reduced.

Further, since the electric disc brake can perform the electric braking function as well as the parking assist braking function without an additional electric parking brake, the back-up function can be ensured when the electric disc brake or the electric parking brake malfunctions.

In addition, the control logic can be flexibly performed even if the load condition is changed according to the weight of the vehicle, occupants and freights.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
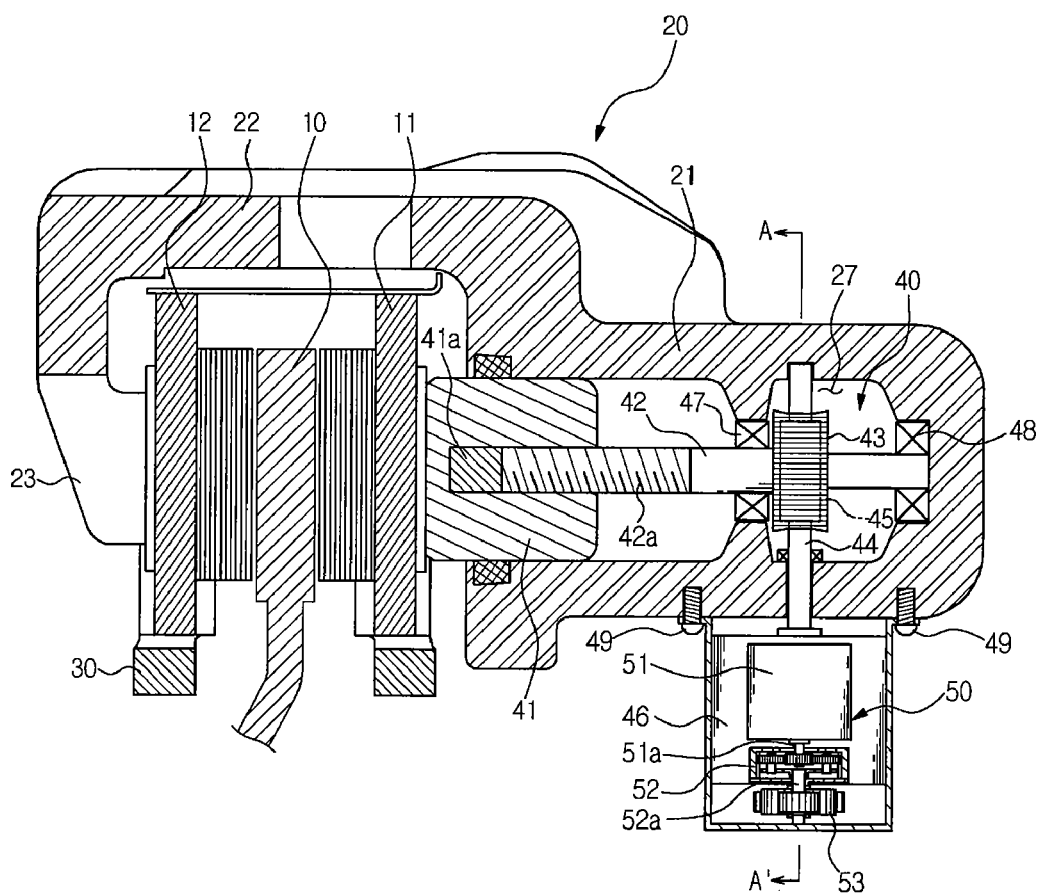
FIG. 1 is a sectional view showing an electric disc brake according to an embodiment of the present invention.

Reference will now be made in detail to the embodiments of the present invention, examples of which are illustrated in the accompanying drawings, wherein like reference numerals refer to the like elements. The embodiments are described below to explain the present invention by referring to the figures.

As shown in FIG. 1, an electric disc brake according to the present invention includes a disc 10 rotating together with wheels of a vehicle, first and second friction pads 11 and 12 installed at both sides of the disc 10 to perform the braking function by pressing both lateral sides of the disc 10, a caliper housing 20 for pressing the first and second friction pads 11 and 12, and a pressing device 40 installed in the caliper hosing 20 for the purpose of braking operation.

The first and second friction pads 11 and 12 are supported by a carrier 30 fixed to a vehicle body in such a manner that the first and second friction pads 11 and 12 can move back and forth with respect to both lateral sides of the disc 10, and the caliper housing 20 is also supported by the carrier 30 in such a manner that the caliper housing 20 can move back and forth to press or release the first and second friction pads 11 and 12.

The caliper housing 20 includes a hollow body 21, an extension part 22 extending from the body 21 toward the second friction pad 12, and a finger part 23 connected to the extension part 22 to support a rear surface of the second friction pad 12. In addition, the pressing device 40 is installed in the body 21 of the caliper housing 20 to press the first friction pad 11.

Figure 2:
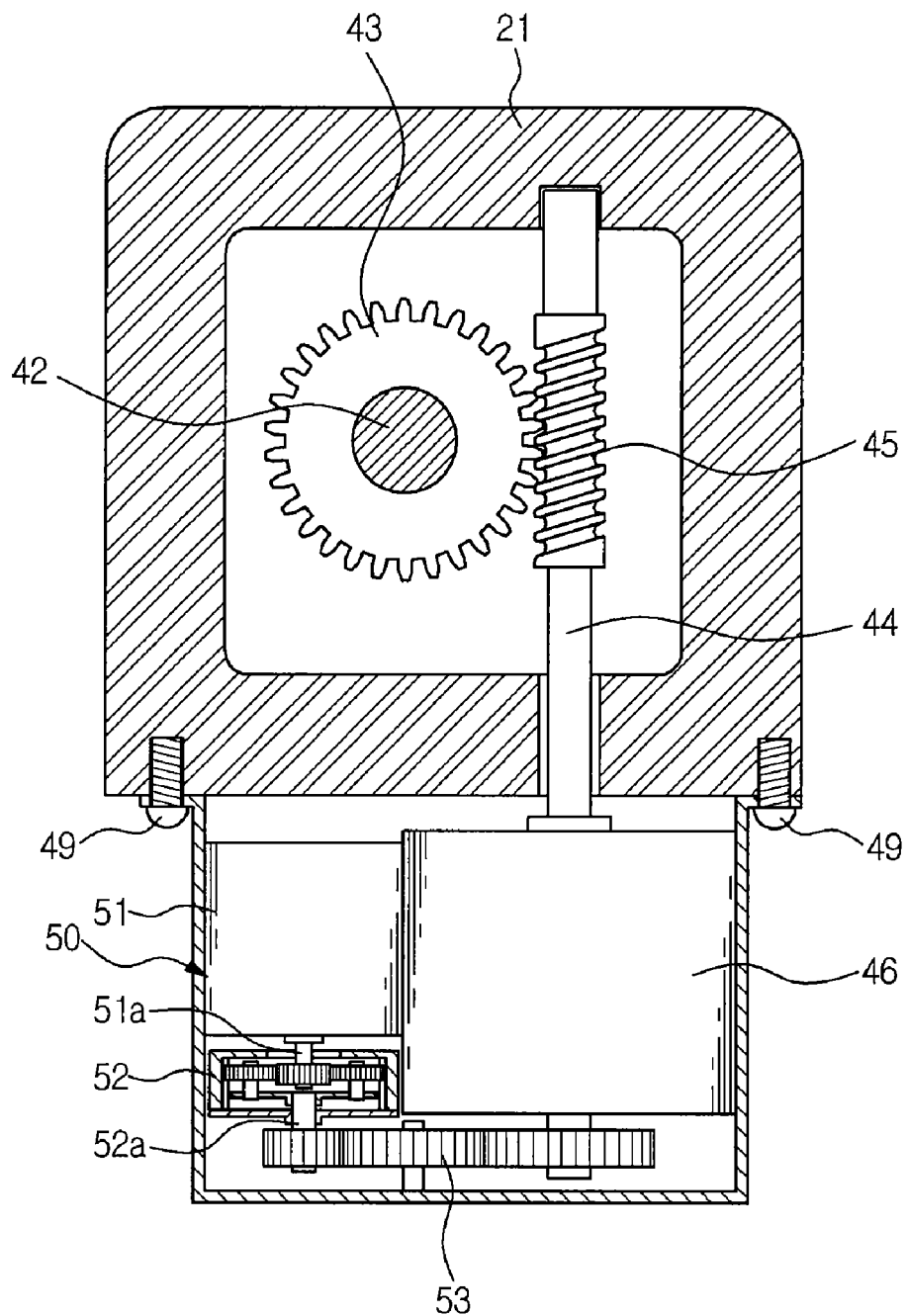
FIG. 2 is a sectional view taken along line A-A' of FIG. 1.

As shown in FIGS. 1 and 2, the pressing device 40 includes a pressing member 41 installed in the body 21 of the caliper housing 20 such that the pressing member 41 can press or release the first friction pad 11 while moving back and forth, a screw shaft 42 coupled to the pressing member 41, a worm wheel 43 coupled to the screw shaft 42, a driving shaft 44 crossing the screw shaft 42 and having a worm gear 45 engaged with the worm wheel 43, and a motor 46 for rotating the driving shaft 44 in the forward or reverse direction. In addition, the pressing device 40 includes an auxiliary pressing device 50 for additionally pressing the first friction pad 11.

The pressing member 41 is installed in the body 21 of the caliper housing such that the pressing member 41 can move back and forth in the body 21 in a state in which rotation of the pressing member 41 is restricted. The pressing member 41 has a female screw part 41a engaged with the screw shaft 42. In order to restrict the rotation of the pressing member 41, an outer surface of the pressing member 41 and an inner surface of the body 21, which corresponds to the outer surface of the pressing member 41, have polygonal shapes. Otherwise, a guide unit (not shown) including a key and a key hole can be formed on the outer surface of the pressing member 41 and the inner surface of the body 21 to restrict the rotation of the pressing member 41.

The screw shaft 42 is provided at one side thereof with a male screw part 42a engaged with the female screw part 41a of the pressing member 41. The screw shaft 42 is rotatably installed in the body 21 in parallel to the movement direction of the pressing member 41. First and second bearings 47 and 48 are installed in the body 21 while being spaced apart from each other to support the screw shaft 42.

The worm wheel 43 is fitted around the screw shaft 42 such that the worm wheel 43 can rotate in an empty space 27 of the body 21, and the driving shaft 44 crosses the screw shaft 42 such that the worm gear 45 provided on the outer surface of the driving shaft may engage with the worm wheel 43. The driving shaft 44 is rotatably supported by the body 21 and a part of the driving shaft 44 where the worm wheel 43 is installed is positioned in the body 21. One end of the driving shaft 44 extends out of the body 21 by passing through a lower portion of the body 21.

The motor is fixed to the lower portion of the body 21 of the caliper housing 20 by a fixing screw 49 to transfer power to the driving shaft 44 extending out of the body 21.

As shown in FIG. 2, the auxiliary pressing device 50 includes an auxiliary motor 51, a first gear 52 fitted around a shaft 51a of the auxiliary motor 51, a first gear shaft 52a coupled to the first gear 52, and a second gear 53 coupled to the first gear shaft 52a and connected to the driving shaft 44. According to the electric disc brake having the above structure, rotational force of the auxiliary motor 51 is reduced by the auxiliary pressing device 50, so the pressing member 41 can press the first friction pad 11 with greater force, thereby generating greater braking force.

Hereinafter, the operation of the electric disc brake will be described.

If a driver steps on a brake, the motor 46 is driven in the forward direction for the purpose of the braking operation. In addition, if the driver stops the braking operation, the motor 46 is driven in the reverse direction.

If the motor 46 is driven in the forward direction for the purpose of the braking operation, the driving shaft 44 may rotate.

As the driving shaft 44 rotates, the worm gear 45 is rotated so that the worm wheel 43 engaged with the worm gear 45 is rotated. Thus, the screw shaft 42 is also rotated. At this time, since speed reduction occurs due to the high reduction gear ratio between the worm gear 45 and the worm wheel 43, the screw shaft 42 rotates at a relatively low speed, so that higher torque is transferred to the screw shaft 42.

If the screw shaft 42 rotates, the pressing member 41 moves toward the first friction pad 11 to press the first friction pad 11, and the caliper housing 20 moves backward relative to the pressing member 41, so that the finger part 23 presses the second friction pad 12 toward the disc 10, thereby achieving the braking operation. In addition, if the motor 46 is driven in the reverse direction to stop the braking operation, the pressing member 41 moves backward from the first friction pad 11 so that the braking operation is released.

In such an electric disc brake, the rotational speed of the motor 46 is reduced by the worm gear 45 and the worm wheel 43, so that the torque transferred to the screw shaft 42 is increased proportionally to the gear reduction ratio between the worm gear 45 and the worm wheel 43. Thus, the pressing member 41 can press the first friction pad 11 with greater force, thereby generating greater braking force.

Therefore, the electric disc brake can achieve sufficient braking force even if the motor has a small size and a low output, so that a volume of a device can be reduced.

In addition, the motor 46 can be installed below the body 21 of the caliper housing 20 by adjusting the alignment direction of the screw shaft 42, so the device can be prevented from being lengthened in the length direction of the screw shaft 42. In this case, the installation space for the device can be reduced so that the device can be easily installed in the vehicle.

Hereinafter, the auxiliary braking operation of the electric disc brake will be described. First, the auxiliary motor 51 is driven for the purpose of the auxiliary braking operation and rotational force of the auxiliary motor 51 is transferred to the shaft 51a of the auxiliary motor 51.

Thus, the first gear 52 is rotated together with the shaft 51a of the auxiliary motor 51, so that the second gear 53 coupled to the first gear shaft 52a of the first gear 52 is also rotated. The rotational force of the second gear 53 is transferred to the driving shaft 44, so that the pressing member 41 can press the first friction pad 11 with greater force.

Figure 3:
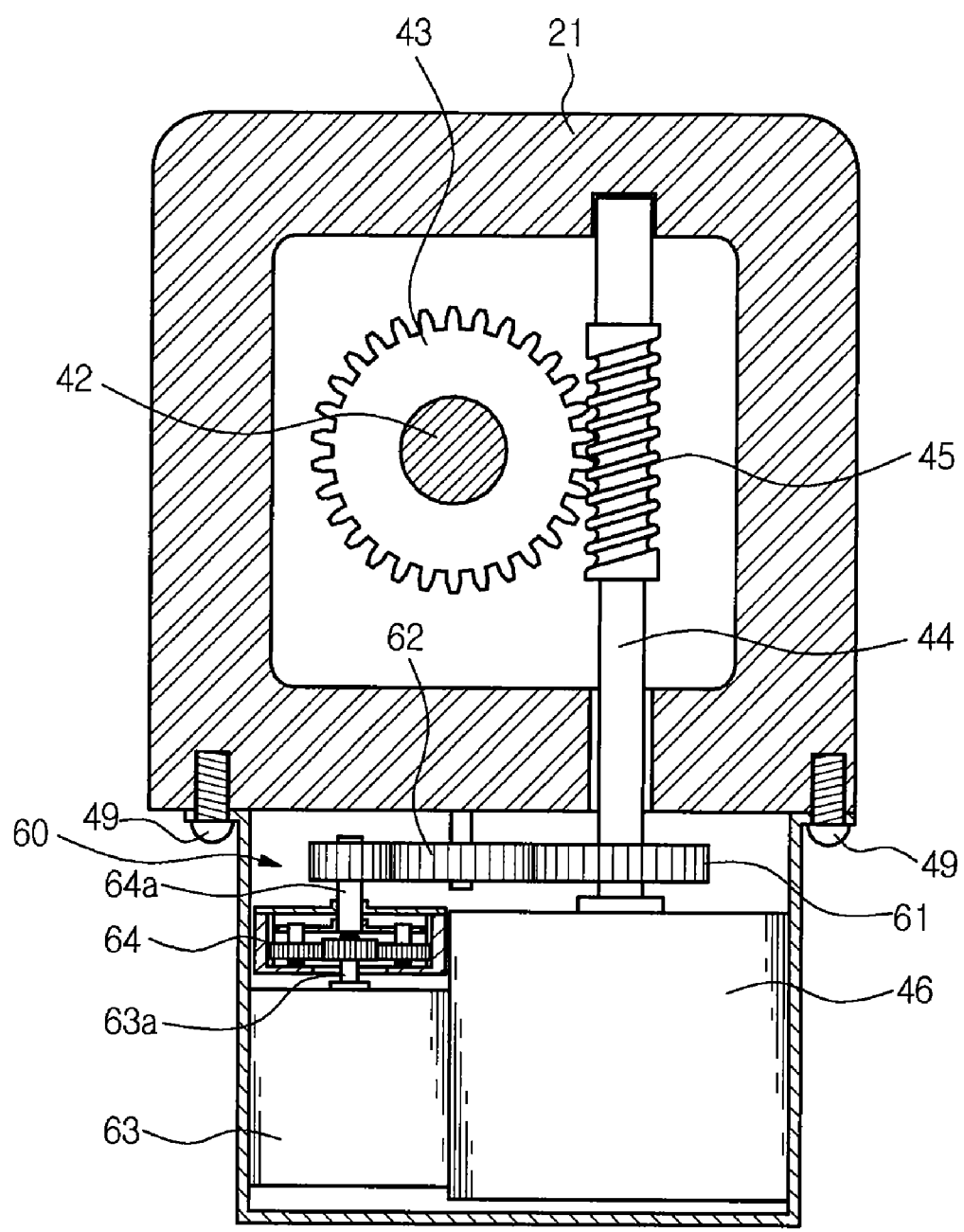
FIG. 3 is a sectional view showing an auxiliary pressing device of an electric disc brake according to another embodiment of the present invention.

FIG. 3 is a sectional view showing an auxiliary pressing device of an electric disc brake according to another embodiment of the present invention.

Referring to FIG. 3, the auxiliary pressing device 60 includes a first gear 61 fitted around the driving shaft 44, a second gear 62 engaged with the first gear 61, an auxiliary motor 63, a third gear 64 fitted around a shaft 63a of the auxiliary motor 63, and a third gear shaft 64a coupled to the third gear 64. The second gear 62 is fitted around the third gear shaft 64a.

As the auxiliary motor 63 is driven for the purpose of the braking operation, rotational force of the auxiliary motor 63 is transferred to the shaft 63a of the auxiliary motor 63, so that the third gear 64 is rotated by the shaft 63a of the auxiliary motor 63.

Rotational force of the third gear 64 is transferred to the third gear shaft 64a, so that the second gear 62 is rotated by the third gear shaft 64a.

As the second gear 62 rotates, the first gear 61 also rotates so that the rotational force of the first gear 61 is transferred to the driving shaft 44, thereby enabling the pressing member 41 to press the first friction pad 11 with greater braking force.

Figure 4:
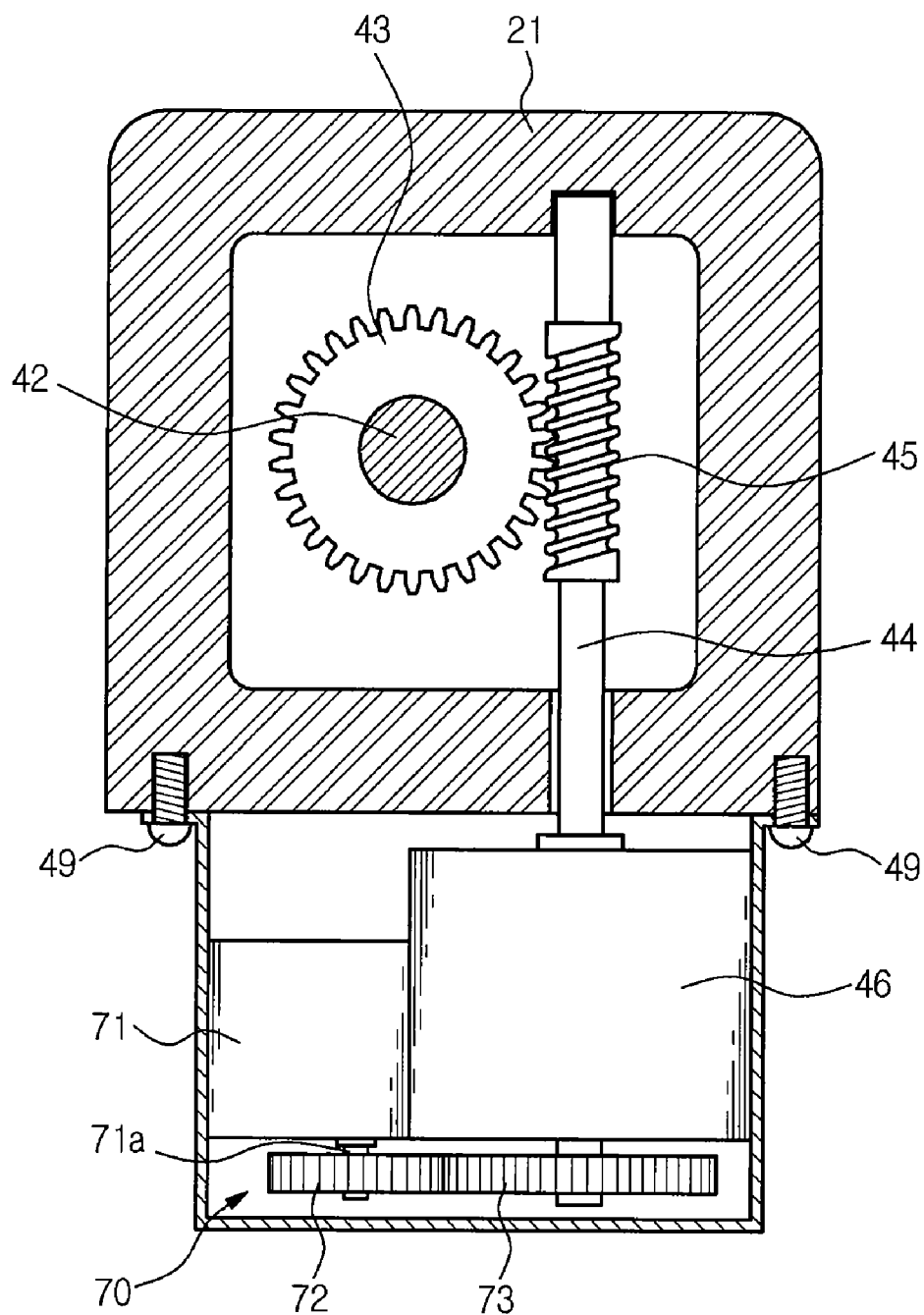
FIG. 4 is a sectional view showing an auxiliary pressing device of an electric disc brake according to still another embodiment of the present invention.

FIG. 4 is a sectional view showing an auxiliary pressing device of an electric disc brake according to still another embodiment of the present invention.

Referring to FIG. 4, the auxiliary pressing device 70 includes an auxiliary motor 71, a first gear 72 fitted around a shaft 71a of the auxiliary motor 71, and a second gear 73 engaged with the first gear 72 and connected to the driving shaft 44.

As the auxiliary motor 71 is driven, rotational force of the auxiliary motor 71 is transferred to the shaft 71a of the auxiliary motor 71, so that the first gear 72 is rotated by the shaft 71a of the auxiliary motor 71. As the first gear 72 rotates, the second gear 73 engaged with the first gear 72 is rotated and rotational force of the second gear 73 is transferred to the driving shaft 44, thereby enabling the pressing member 41 to press the first friction pad 11 with greater braking force.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric disc brake, comprising:
    friction pads for pressing a disc:
    a carrier for supporting the friction pads;
    a caliper housing supported by the carrier such that the caliper housing moves back and forth to press the friction pads; and
    a pressing device for pressing the friction pads,
    wherein the pressing device includes:
        a pressing member moving back and forth in the caliper housing to press one of the friction pads;
        a screw shaft coupled to the pressing member;
        a worm wheel coupled to the screw shaft;
        a driving shaft crossing the screw shaft and having a worm gear engaged with the worm wheel;
        a motor for rotating the driving shaft in a forward direction or a reverse direction; and
    an auxiliary pressing device,
    wherein the auxiliary pressing device includes:
        a first gear fitted around the driving shaft;
        a second gear engaged with the first gear;
        an auxiliary motor;
        a third gear fitted around a shaft of the auxiliary motor; and
        a third gear shaft coupled to the third gear,
        wherein the second gear is coupled to the third gear shaft.

* * * * *